G. E. DEAN.
WELDING MACHINE.
APPLICATION FILED APR. 21, 1911.
1,006,536.
Patented Oct. 24, 1911.
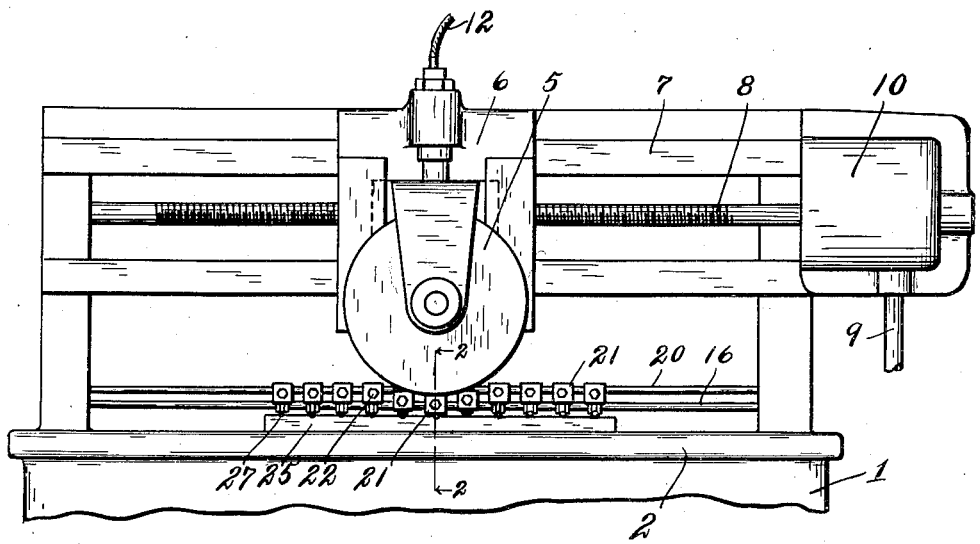
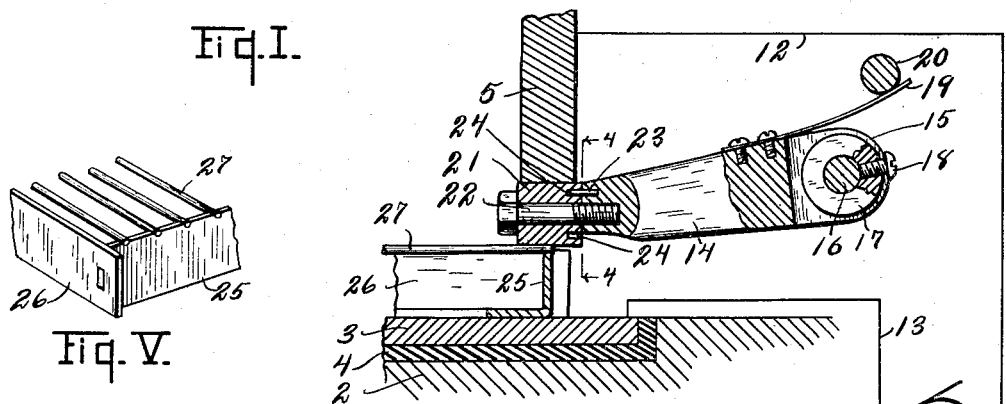
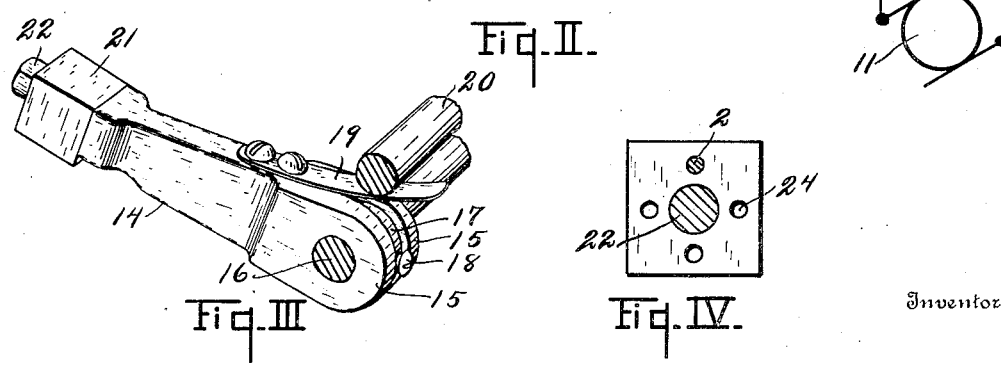

UNITED STATES PATENT OFFICE.

GEORGE E. DEAN, OF ALBION, MICHIGAN, ASSIGNOR TO UNION STEEL SCREEN COMPANY, OF ALBION, MICHIGAN.

WELDING-MACHINE.

1,006,536.	Specification of Letters Patent.	Patented Oct. 24, 1911.

Application filed April 21, 1911. Serial No. 622,568.

*To all whom it may concern:*

Be it known that I, GEORGE E. DEAN, a citizen of the United States, residing at Albion, Michigan, have invented certain new and useful Improvements in Welding-Machines, of which the following is a specification.

This invention relates to improvements in welding machines.

My improved welding machine is especially designed by me for use in the manufacture of oven, refrigerator, bread rack shelves and the like and I have illustrated my improvements embodied in a machine designed for that purpose. They are, however, adapted for use and may be readily embodied in machines for use in the manufacture of a great variety of articles.

The main objects of this invention are: First, to provide an improved welding machine in which the position of the parts to be welded are not likely to be displaced by the operation of the machine, thus obviating the necessity of securely clamping the parts to be joined. Second, to provide an improved welding machine which may be very rapidly operated. Third, to provide an improved welding machine which may be readily adjusted to different classes of work. Fourth, to provide an improved welding machine which is simple in structure and not likely to get out of repair and one which is durable in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a front elevation of a structure embodying the features of my invention, work being shown in the machine. Fig. II is an enlarged detail vertical section taken on a line corresponding to line 2—2 of Fig. I, a generator being shown with electrical connections to the terminal members. Fig. III is a detail perspective view of one of the contact members 14. Fig. IV is an enlarged detail section taken on a line corresponding to line 4—4 of Fig. II. Fig. V is a detail perspective view of a shelf manufactured with my improved machine, the shelf being here shown to assist in illustrating the invention and its operation.

In the drawings, similar reference characters refer to similar parts throughout the several views, and the sectional views are taken looking in the direction of the little arrows at the ends of the section lines.

Referring to the drawing, 1 represents the frame of the machine which has a bed 2. Into this bed 2 a plate like bed terminal 3 is set, the terminal being suitably insulated from the frame by the insulating sheet 4. Coacting with this terminal 3 is a traveling terminal 5 mounted in the carriage 6. This carriage is mounted on a suitable way 7 and is driven by the threaded shaft 8. The shaft is connected to the driving shaft 9 by suitable gears, which are inclosed in the casing 10 in the structure illustrated.

The terminal members are connected to the dynamo 11 by the circuit wires 12 and 13 as illustrated in conventional form in Fig. II. In the structure illustrated the traveling terminal member 5 is a wheel. Coacting with this traveling terminal member 5 is a plurality of contact members 14 over which it travels. These contact members 14 in the structure illustrated are provided with pairs of pivot ears 15 through which the pivot rod 16 is arranged. The contact members are supported on the rod to permit lateral adjustment by the collars 17 arranged between the ears, the collars being provided with set screws 18. The contact members are supported normally in their work disengaging positions by springs 19, which are secured at one end to the contact members, their other ends engaging the rod 20. As the terminal member 5 travels across the contact members, the contact members are forced into their work engaging position and the current passes through these contact members.

The contact members are preferably provided with contact blocks 21 of brass or copper or other good conductor material. These blocks are secured by the screws 22, arranged centrally through the blocks so that they may be turned on the screws. They are held in their adjusted position on the screws by means of the dowel pins 23, which are adapted to be engaged in any one of the holes 24. Thus secured any of the sides of the block may be brought into position to engage the work. As the traveling contact member travels over these contacts they are forced down in vertical planes into engagement with the work and there is no tendency for the parts to be joined being shoved out of their proper position, as is the case where the traveling contact members travel directly upon the work. Further the traveling terminal wheel member not coming in direct contact with the work is subjected to comparatively little wear or injury from arching. In Fig. V I illustrate a shelf such as are manufactured with my improved machine. This shelf consists of frame pieces 25 and 26 with cross bars 27. When it is attempted to use the machine without the contact members the cross wires or bars are very likely to be forced out of position. It is quite impractical to hold the parts in the proper position for the welding operation of the machine by the aid of clamps on account of the expense of labor required for adjusting the same. However, with my improvements such clamps are not necessary.

I have illustrated my improvements in the form in which I have embodied the same for use. I am however, aware that various structural modifications are possible without departing from my invention. I have not attempted to illustrate or describe such modifications as they will no doubt be readily understood by those skilled in the art to which this invention relates.

Having thus described my invention, what I claim as new and desire to secure by Letters Patent is:

1. In a welding machine, the combination of a bed terminal member, a coacting wheel terminal member reciprocatingly supported above said bed terminal member, contact members over which said wheel terminal member is adapted to travel, said contact members being provided with pairs of pivot ears, a pivot rod therefor, collars provided with securing screws located between said ears, blade springs mounted on said contact members, and a rod arranged to engage said springs whereby said contact members are yieldingly supported in their work disengaging positions.

2. In a welding machine, the combination of a traveling wheel terminal member, contact members over which said wheel terminal member is adapted to travel, said contact members being provided with pairs of pivot ears, a pivot rod, collars provided with set screws located between said ears, blade springs mounted on said contact members, and a rod arranged to engage said springs whereby said contact members are yieldingly supported in their work disengaging positions.

3. In a welding machine, the combination of a traveling terminal member, contact members over which said terminal member is adapted to travel, a pivot rod on which said contact members are mounted for lateral adjustment, blade springs mounted on said contact members, and a rod arranged to engage said springs whereby said contact members are yieldingly supported in their work disengaging positions.

4. In a welding machine, the combination of a traveling terminal member, contact members over which said terminal member is adapted to travel, a pivot rod on which said contact members are mounted, blade springs mounted on said contact members, and a rod arranged to engage said springs whereby said contact members are yieldingly supported in their work disengaging positions.

5. In a welding machine, the combination of a traveling terminal member, pivoted contact members over which said terminal member is adapted to travel, and springs for yieldingly supporting said contact members in their work disengaging positions.

6. In a welding machine, the combination of a terminal member, coacting contact members, a pivot rod on which said contact members are mounted for lateral adjustment, and supporting springs for said contact members.

7. In a welding machine, the combination of a terminal member, coacting contact members, a pivot rod on which said contact members are mounted and supporting springs for said contact members.

8. In a welding machine, the combination of a traveling terminal member, contact members over which said terminal member is adapted to travel, said contact members being provided with adjustable contact blocks and means for holding said contact members yieldingly in their work disengaging positions.

9. In a welding machine, the combination of a bed terminal member, a wheel terminal member, laterally adjustable pivotally supported contact members, adapted to be successively engaged by said wheel terminal member as it travels across them, and means for yieldingly supporting said contact members in their work disengaging position.

10. In a welding machine the combination of a terminal member, a coacting contact member, a contact block therefor, said contact block having a plurality of dowel pin holes thereon, a supporting screw for said contact block and a dowel pin on said contact member adapted to be engaged in said dowel holes, for the purpose specified.

11. In a welding machine, the combination with a bed terminal member, of a plurality of movably supported work engaging contact members, said contact members being provided with means for holding them normally in their work disengaging position; and a traveling wheel terminal member arranged to travel over said contact members to successively engage them with the work and connect them in a circuit.

12. In a welding machine, the combination with a bed terminal member, of a plurality of movably supported work engaging contact members, said contact members being provided with means for holding them normally in their work disengaging position; and a traveling terminal member arranged to travel over said contact members to successively engage them with the work and connect them in a circuit.

In witness whereof, I have hereunto set my hand and seal in the presence of two witnesses.

GEORGE E. DEAN. [L. S.]

Witnesses:
 NINA CUATT,
 MINNIE SCHUMACHER.